US012462092B2

(12) United States Patent
Xu et al.

(10) Patent No.: US 12,462,092 B2
(45) Date of Patent: Nov. 4, 2025

(54) PROGRESS TRACKING WITH AUTOMATIC SYMBOL DETECTION

(71) Applicant: Autodesk, Inc., San Rafael, CA (US)

(72) Inventors: Xin Xu, San Francisco, CA (US); Graham Garland, San Francisco, CA (US); James Wang, San Francisco, CA (US); Cory Wolnewitz, Jupiter, FL (US); Christine Laffitte, San Francisco, CA (US); Alexander Huang, Fremont, CA (US); Nikita Shalimov, Oakland, CA (US); Nicholas Moores, Oakland, CA (US); Brian Suwan Soe, San Bruno, CA (US); Anand Rajagopal, San Francisco, CA (US); Arjun Nayini, Oakland, CA (US); Sanjay Penumetsa Raju, Burlington, MA (US); Jeffrey Lin, Pittsburgh, PA (US); Joseph Michael Bryan, San Francisco, CA (US); Paulo Rodrigues Espeschite Arantes, San Francisco, CA (US)

(73) Assignee: AUTODESK, INC., San Francisco, CA (US)

( * ) Notice: Subject to any disclaimer, the term of this patent is extended or adjusted under 35 U.S.C. 154(b) by 969 days.

(21) Appl. No.: 17/461,541

(22) Filed: Aug. 30, 2021

(65) Prior Publication Data
US 2022/0156418 A1 May 19, 2022

Related U.S. Application Data

(60) Provisional application No. 63/114,933, filed on Nov. 17, 2020.

(51) Int. Cl.
G06F 40/117 (2020.01)

(52) U.S. Cl.
CPC .................. *G06F 40/117* (2020.01)

(58) Field of Classification Search
CPC ..... G06F 40/117; G06F 30/27; G06F 2111/12
(Continued)

(56) References Cited

U.S. PATENT DOCUMENTS 5,251,268 A   10/1993   Colley et al.
5,761,328 A   6/1998    Solberg et al.
(Continued)

FOREIGN PATENT DOCUMENTS

| CN | 101553771 | 10/2009 |
| CN | 111382778 | 7/2020 |
| JP | 2018206250 | 12/2018 |

OTHER PUBLICATIONS

Extended European Search Report dated Mar. 30, 2022 for European Patent Application No. 21208417.2.
(Continued)

*Primary Examiner* — Stephen S Hong
*Assistant Examiner* — Broderick C Anderson
(74) *Attorney, Agent, or Firm* — Gates & Cooper LLP

(57) ABSTRACT

A method and system provide the ability to track object progress in a drawing sheet. An object type is created and activity types are assigned to the object type. The activity types represent a progression of an object of the object type. A portable document format (PDF) drawing sheet that has multiple symbol instances is obtained. A graphic region containing a symbol instance is selected in the drawing sheet. A markup is created on the drawing sheet based on the selected graphic region. Multiple symbol instances are autonomously detected based on the selected graphic region. Progress tracking markup instances of the markup are autonomously created for the detected symbol instances and are linked to the object type. The progress of the object
(Continued)

instances is visually tracked using graphical user interface (GUI) visualizations that provide a visual representation of the progression via the markups.

20 Claims, 17 Drawing Sheets

(58) Field of Classification Search
USPC .......................................................... 715/233
See application file for complete search history.

(56) References Cited

U.S. PATENT DOCUMENTS

| | | | |
|---|---|---|---|
| 2002/0026343 A1* | 2/2002 | Duenke .............. | G06Q 30/0283 705/400 |
| 2002/0055955 A1* | 5/2002 | Lloyd-Jones .......... | G06F 16/58 707/E17.026 |
| 2012/0116728 A1 | 5/2012 | Shear et al. | |
| 2014/0244338 A1* | 8/2014 | Buzz ..................... | G06Q 10/06 705/7.23 |
| 2019/0205484 A1* | 7/2019 | Morkos ............ | G06Q 10/06313 |
| 2019/0325089 A1* | 10/2019 | Golparvar-Fard .... | G06T 19/003 |
| 2020/0265121 A1* | 8/2020 | Myers ................... | G06T 11/203 |
| 2021/0150088 A1 | 5/2021 | Gallo et al. | |

OTHER PUBLICATIONS

Non-Final Office Action dated Mar. 11, 2025 for U.S. Appl. No. 17/514,740.

EPA, "Brownfields Redevelopment and Land Revitalization." Last modified Feb. 21, 2016. https://archive.epa.gov/socal/web/html/brownfields.html (Year: 2016).

Aerocad et al., "Back Drafting Color Codes." CADTutor. Apr. 13, 2011. https://www.cadtutor.net/forum/topic/29873-back-drafting-color-codes/ (Year: 2011).

Zhang, Fan etal. "DetReco: Object-Text Detection and Recognition Based on Deep Neural Network." Mathematical Problems in Engineering, Jul. 14, 2020 (Year: 2020).

T. Cheng, J. Khan, H. Liu and D. Y. Y. Yun, "A symbol recognition system," Proceedings of 2nd International Conference on Document Analysis and Recognition (ICDAR '93), Tsukuba, Japan, 1993, pp. 918-921, doi: 10.1109/ICDAR.1993.395587. (Year: 1993).

F. S. Khan, R. M. Anwer, J. van de Weijer, A. D. Bagdanov, M. Vanrell and A. M. Lopez, "Color attributes for object detection," 2012 IEEE Conference on Computer Vision and Pattern Recognition, Providence, RI, USA, 2012, pp. 3306-3313, doi: 10.1109/CVPR.2012.6248068. (Year: 2012).

European Examination Report dated Dec. 2, 2024 for European Patent Application No. 21208483.4.

Chinese Office Action (with English translation) dated May 16, 2025 for Chinese Patent Application No. 2021113312938.

Chinese Office Action (with English translation) dated Jun. 17, 2025 for Chinese Patent Application No. 2021112869022.

Final Office Action dated Aug. 1, 2025 for U.S. Appl. No. 17/514,740.

Park, J., et al., "Recognition of assembly instructions based on geometric feature and text recognition.", 2020 17th International Conference on Ubiquitous Robots (UR), pp. 139-143. IEEE, 2020.

* cited by examiner

PROGRESS TRACKING WITH AUTOMATIC SYMBOL DETECTION

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 63/114,933, filed on Nov. 17, 2020, with inventor(s) Xin Xu, Graham Garland, James Wang, Cory Wolnewitz, Christine Laffitte, Alexander Huang, Nikita Shalimov, Nicholas Moores, Brian Suwan Soe, Anand Raj agopal, Arjun Nayini, Sanjay Penumetsa Raju, Jeffrey Lin, Joseph Michael Bryan, and Paulo Rodrigues Espeschite Arantes, entitled "Progress Tracking With Automatic Symbol Detection,".

This application is related to the following commonly-assigned patent application, which application is incorporated by reference herein:

U.S. Patent Application Ser. No. 63/114,952, filed on Nov. 17, 2020, by Kevin Cheung, Ravnidar P. Krishnaswamy, and Damian Paul Stephen Wilcox, entitled "Optical Character Recognition (OCR) for Drafting Using Machine Learning: Assisted Drafting Automation from Markups Using Machine Learning,".

BACKGROUND OF THE INVENTION

1. Field of the Invention

The present invention relates generally to building information models (BIM), and in particular, to a method, apparatus, system, and article of manufacture for automatically detecting symbols in a field progress markup of a BIM.

2. Description of the Related Art

In the building industry, architects and designers may utilize computer-aided design (CAD) applications to generate precise two-dimensional (2D) and three-dimensional (3D) CAD drawings to be used throughout the entire process of a design project, from conceptual design to construction or assembly. In other words, a CAD application is essentially a drafting tool that utilizes a computer system to create lines and arcs to represent a building design. Building upon a CAD drawing, a building information model (BIM) application often provides context and tools to further manipulate and work with a CAD design (e.g., labelling a line or set of lines as wall elements). However, both CAD and BIM applications may be complex to use. Accordingly, it is often useful to provide a simple drawing sheet (e.g., that is raster or vector based)(e.g., a portable document format (PDF) image, joint photographic expert group (JPEG) image, graphics interchange format (GIF) image, etc.) that non-CAD/non-BIM designers (or other users that do not have access to, have not installed, and/or are not familiar with a CAD/BIM application, such as field workers) can work with. For example, such a raster/vector based drawing may be plotted by a physical printer, or may be printed/plotted to a vector/raster based format for use in the field. Such vector/raster based drawing sheets do not have the associated properties/parameters for individual CAD/BIM objects/elements within the drawing. Further, once converted into such a vector/raster based drawing sheet, the CAD/BIM context based information is no longer available to/from the vector/raster based drawing sheets.

It is desirable for construction teams to utilize the vector/raster based drawing sheets in a variety of workflows and environments. Field progress markups is a solution that enables construction teams to understand the state of their installation of objects on a project site. In such a workflow, real world objects (e.g., equipment, assets, modules, panels, pillars, etc.) are already graphically represented on a drawing sheet (e.g., via graphical symbols/icons). However, a field worker may desire to represent/markup such objects through the different stages of construction (e.g., as they are being built/constructed). Accordingly, field workers may manually draw shapes (referred to as field markups) on top of the graphic symbols/icons (i.e., the real world objects as represented in the drawing sheet) to enable tracking of the work. Such a workflow may be part of a larger concept of labor tracking, and enables teams to understand if they are installing object and materials on time and within budget.

Markup creation is currently either a manual process, driven by the user self-drawing the markup on the drawing sheet (e.g., via direct annotation of a PDF image), or is imported directly from a BIM as a preexisting data point. However, BIM objects are typically deeply coupled with other metadata, and not often represented at the same fidelity that a user needs for the markup representation. Other prior art products may utilize 3D modeling systems that are complex and difficult for field workers to use and understand (e.g., compared to that of simple 2D raster/vector based drawing sheets). Further, with large drawing sheets consisting of dozens or hundreds of objects, it can be difficult if not impossible to manually draw markups in an efficient and cost-effective manner. For example, each digital plan may have dozens or hundreds of markups that would need to be made, over multiple plans representing all the floors of a building. The manual markup placement process is slow and inefficient with each markup needing to be drawn in a specific shape, on a specific region of the plan.

In view of the above, what is needed is the capability to automatically/autonomously generate field markups on a vector/raster based drawing sheet/plan in an efficient and accurate manner.

SUMMARY OF THE INVENTION

Embodiments of the invention enable the use of field progress markups. Field progress markups with automated symbol detection allows for office teams to automatically detect specific regions on a sheet that they want to turn into trackable markups, tied to the objects they are installing/constructing.

More specifically, field progress markups allow construction teams to visually track the progress of production in the field. Each object that can be tracked is represented through a markup placed on a digital construction plan (seen through a tablet or web experience), and the object is updated through a sequence of color-coordinated activities. For instance, a drywall object may go through the installation stages of "rough-in", "framing" and "closed", each activity represented by a unique color-code.

Automated symbol detection allows the creator to automatically identify the region or digital symbol to be marked, and the digital plan can instantly draw markups that fit the region characteristics. What used to take hours in the prior art can now be done in less than a minute.

Embodiments of the invention further provide for the use of a heuristic or an ML model. A heuristic or ML model is created from preexisting digital sheets that have similar or trained symbols. Upon calling the model, the user applies the model to the region they would like to create like-markups within. The user can then add or delete markups that do not fit the requirement. When the user corrects the markups, the model will capture those changes and learn to improve its symbol detection over time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Progress Tracking

Figure 1:
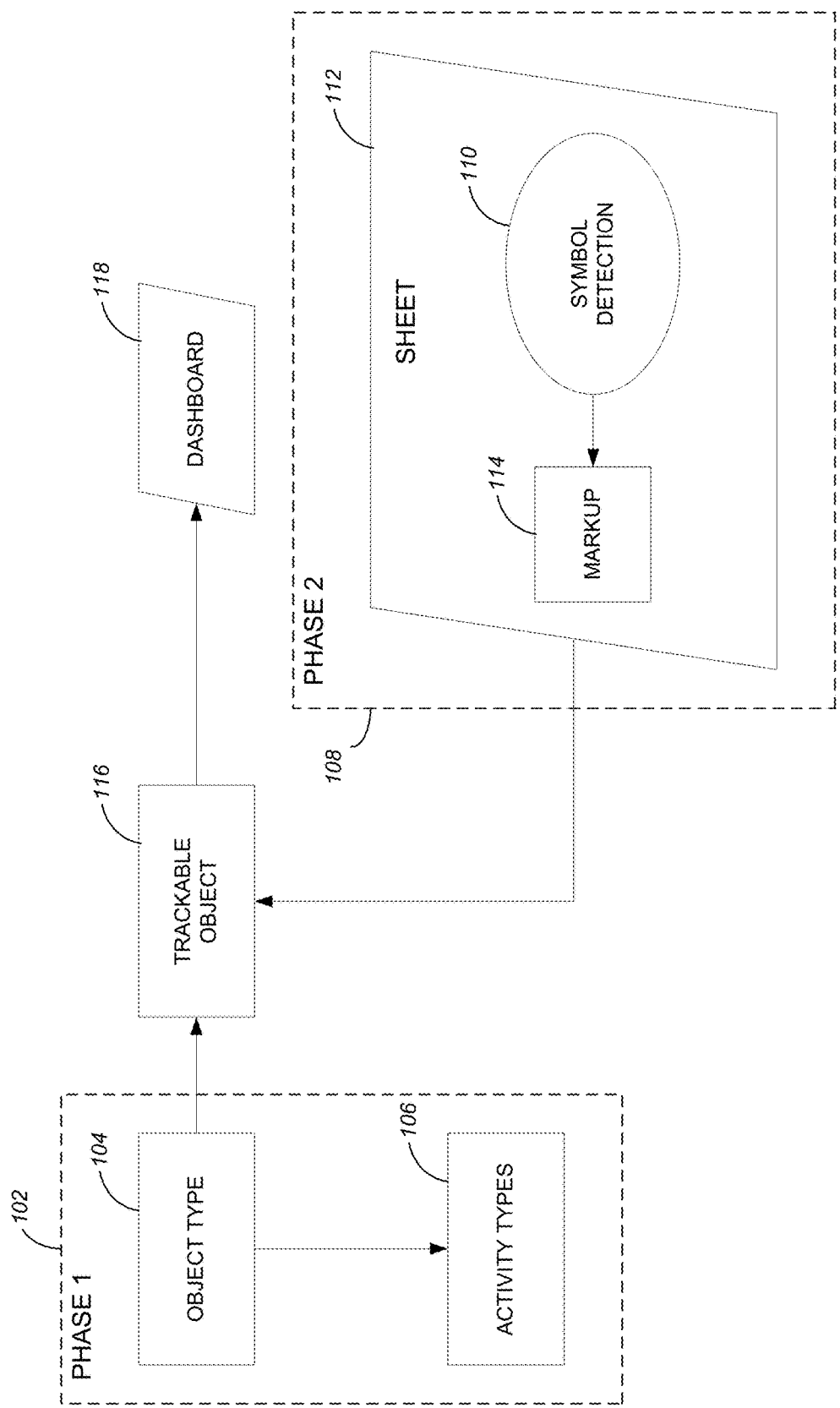
FIG. 1 illustrates the workflow for progress tracking in accordance with one or more embodiments of the invention.

FIG. 1 illustrates the workflow for progress tracking in accordance with one or more embodiments of the invention.

Figure 2A:
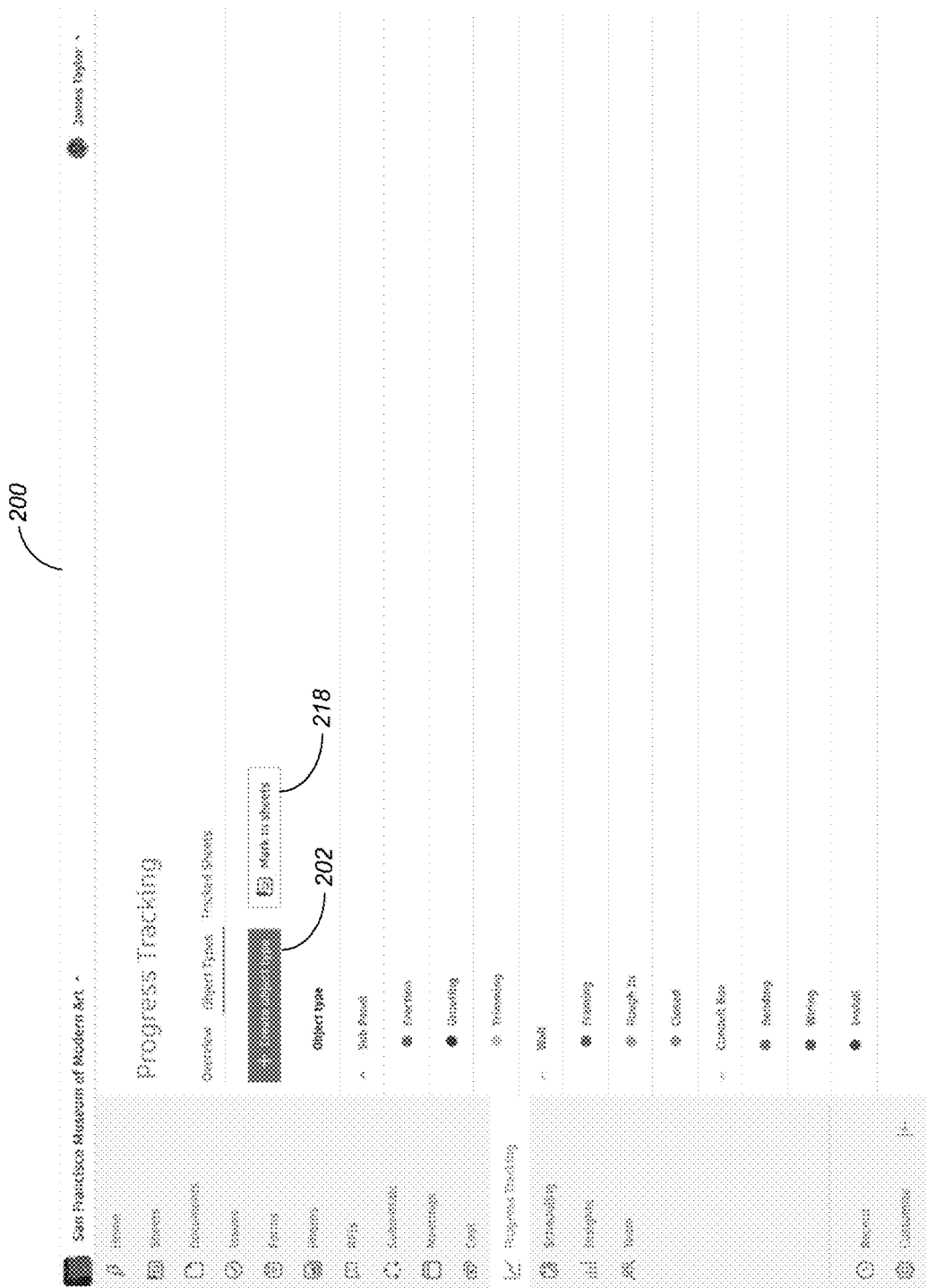
FIG. 2A illustrates a screen shot of a graphical user interface for creating object types in accordance with one or more embodiments of the invention.
Figure 2B:
FIG. 2B illustrates a create object type dialog box in accordance with one or more embodiments of the invention.

During phase 1 102, object types and activities are created. The first step of phase 1 is to specify/create an object type 104. The object type 104 is the high level object the user desires to track. For example, drywall subs may track "walls, fire rated walls, etc." and an electrical sub might track "receptacles or junction boxes". FIG. 2A illustrates a screen shot of a graphical user interface 200 where a user may select the "create object type" button 202 to create the object types the user desires to track. FIG. 2B illustrates a create object type dialog box 204 that may be displayed upon the selection of the create object type button 202 of FIG. 2A. As illustrated, the user can name the object type in area 206. In this regard, FIG. 2B illustrates the entry of the exemplary object type name "Basic Wall". When ready to move to the next step, the user may select "Next" button 208.

Figure 2C:
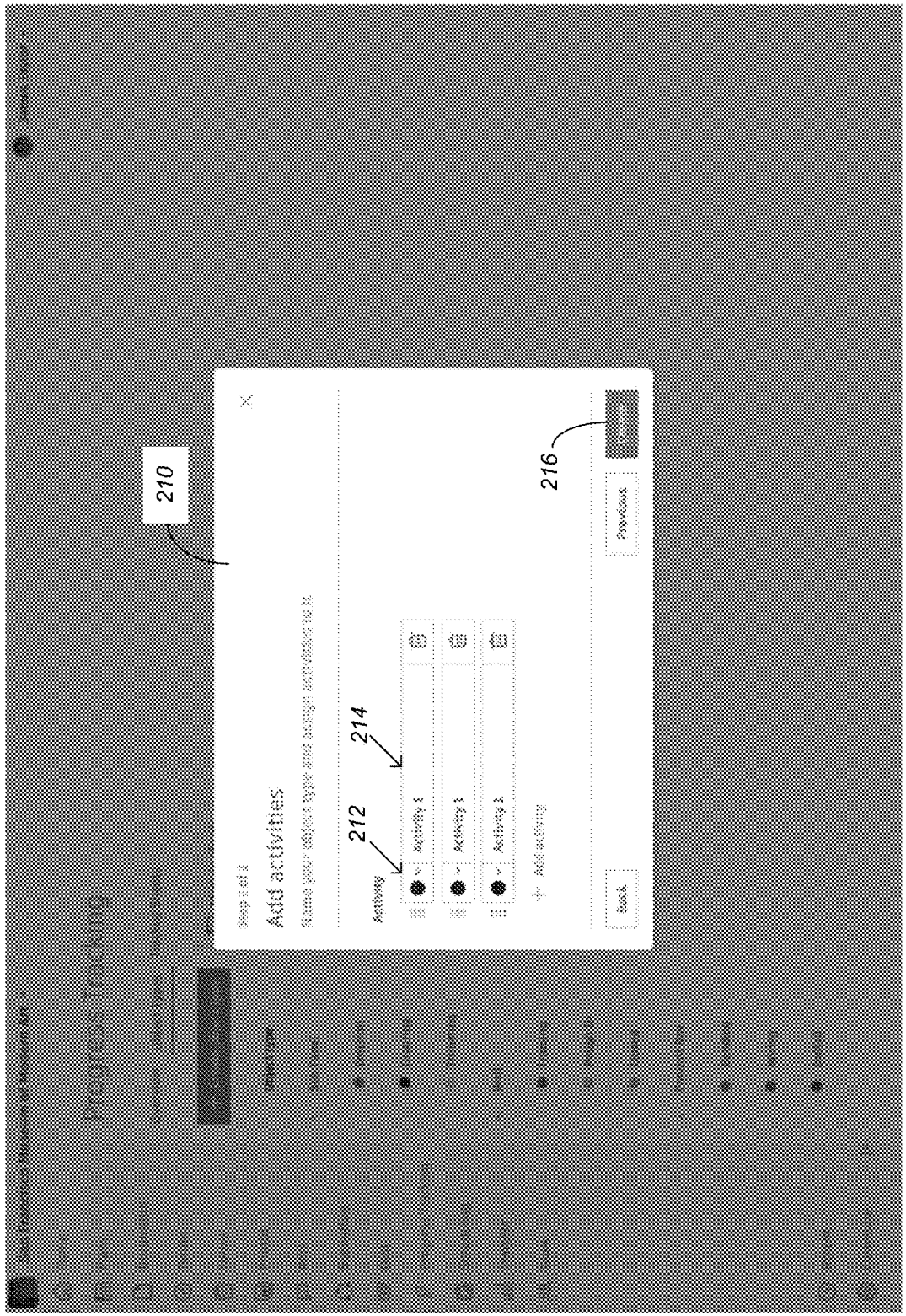
FIG. 2C illustrates an add activities dialog window in accordance with one or more embodiments of the invention.

Returning to FIG. 1, for each object type 104, a set of one or more activity types 106 may be created. The activity types 106 are the specific activities the user would like to track progress on. For example, a "wall" object type may have "framing, insulation, drywall, etc." for activity types (i.e., the wall object type may progress through the different activities). In another example, a "receptacle" object type may have "roughed in, ready to energize, energized, etc." for activity types. FIG. 2C illustrates the add activities dialog window 210 that is displayed once the user has completed creating an object type in FIG. 2B (e.g., by selecting the "next" button 208 of FIG. 2B). In the add activities dialog window 210, the user has the ability to assign the activities to the created object. In exemplary embodiments, the user may specify/assign an optional color for each activity in column 212 and may specify/assign the name of each activity in column 214. To complete the object type creation and assignment of activities, the user can select the "create" button 216.

Returning again to FIG. 1, after creating the object types 104 and assigning activities 106 in phase 1 102, embodiments of the invention transition to phase 2 108 of symbol detection 110 which may be initiated by selecting the "Mark in sheets" button 218 of FIG. 2A. During symbol detection 110, users can select a symbol on a sheet 112 to automatically create progress tracking markups 114 linked to a certain object type 104. The application programming interface (API) for the symbol detection may be a heuristic based machine learning (ML) model. The markup 114 can be linked to a trackable object 116 to provide a visual tracking experience. In this regard, the trackable object 116 is the link between an object type 104 and a markup 114 for the visual tracking experience.

Figure 3A:
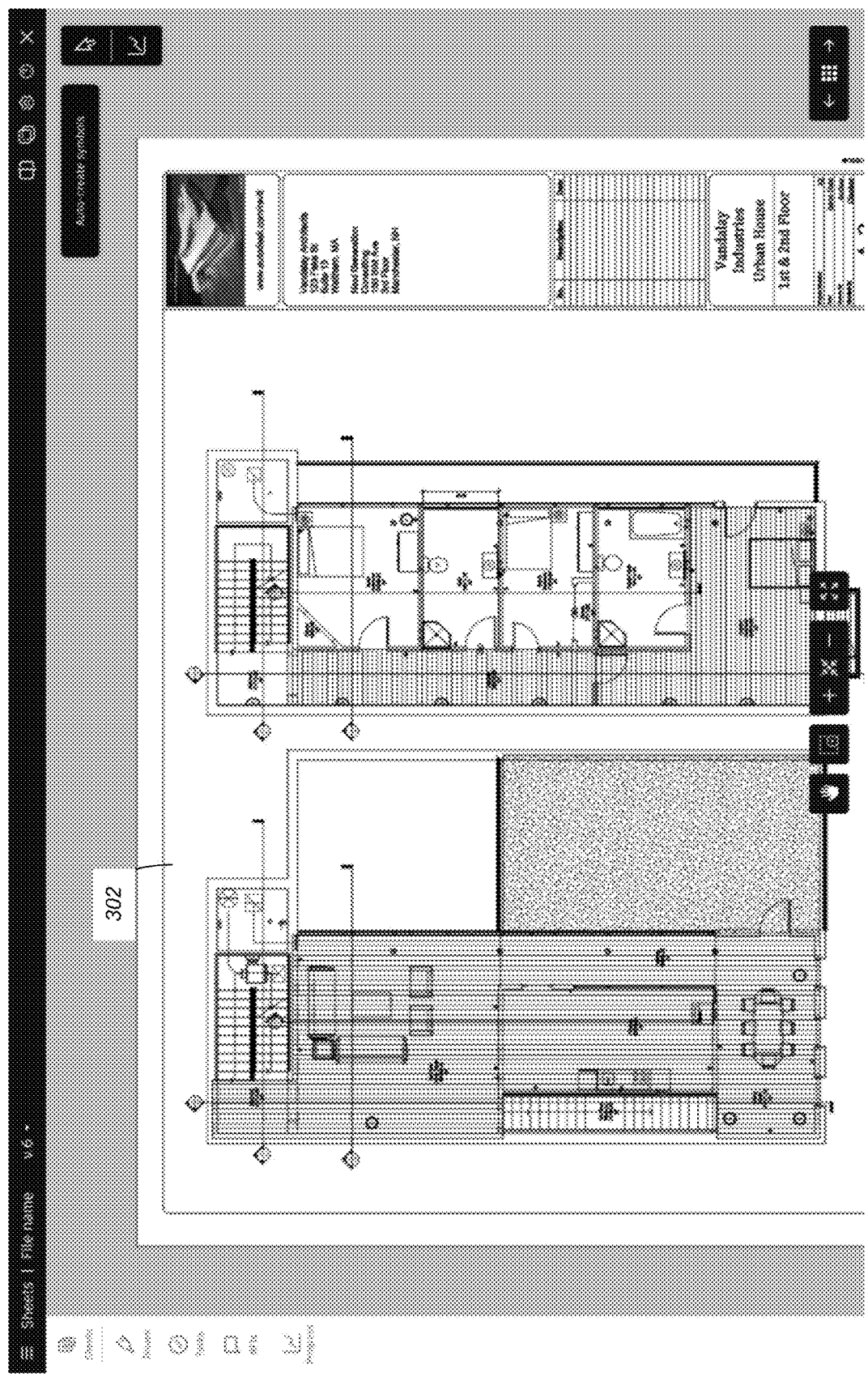
FIG. 3A illustrates an exemplary vector/raster based drawing sheet that has been acquired in accordance with one or more embodiments of the invention.
Figure 3B:
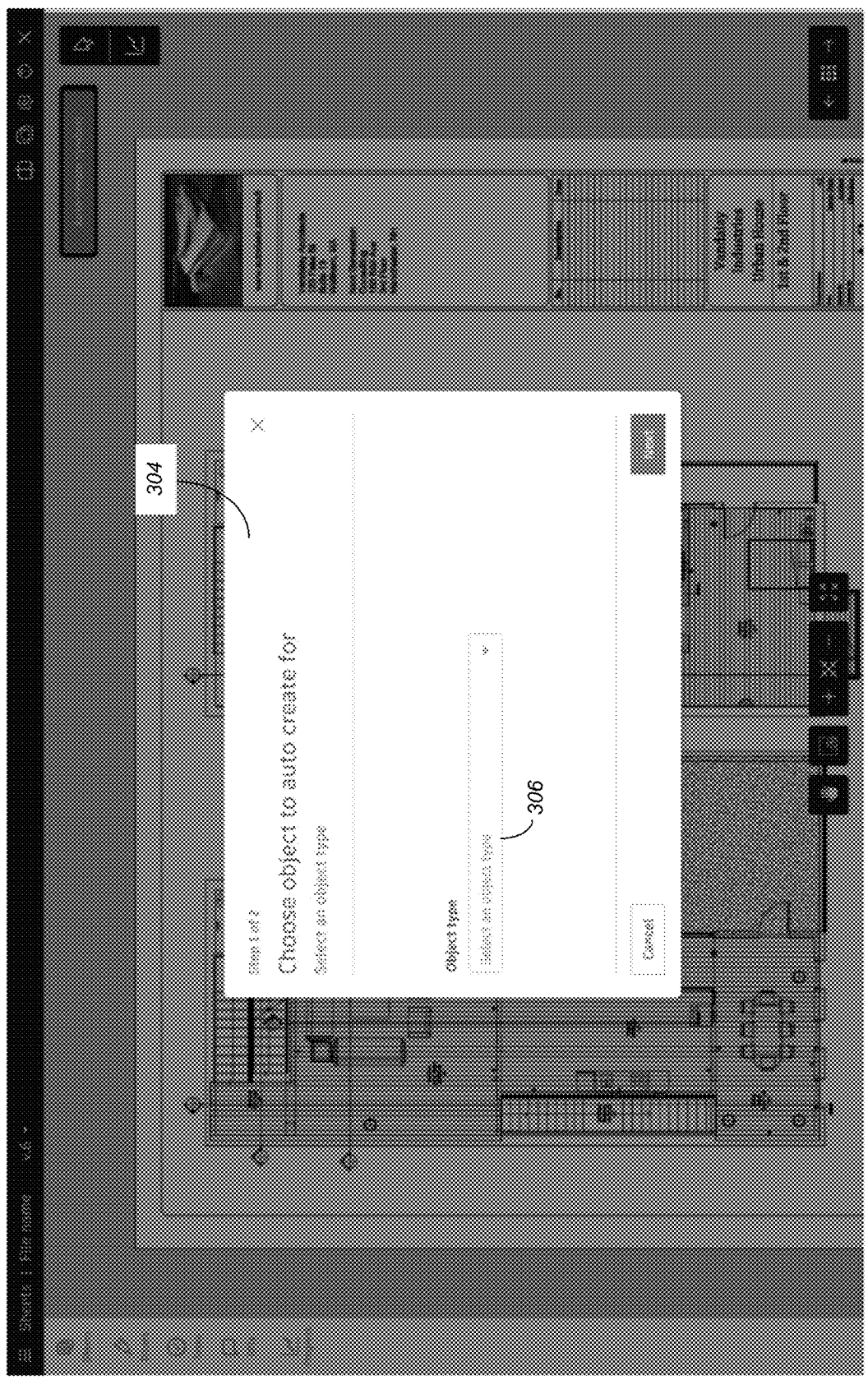
FIG. 3B illustrates an exemplary dialog window used to select the object type in accordance with one or more embodiments of the invention.

To begin phase 2 108, a design drawing sheet 112 is obtained. More specifically, a vector/raster based (e.g., PDF) drawing sheet may be acquired. FIG. 3A illustrates an exemplary vector/raster based (e.g., PDF) drawing sheet 302 that has been acquired. The next step in phase 2 108 is to preselect the object type to run symbol detection for (e.g., drywall object types). FIG. 3B illustrates an exemplary dialog window 304 used to select the object type (e.g., via a drop down selection box 306).

Figure 3C:
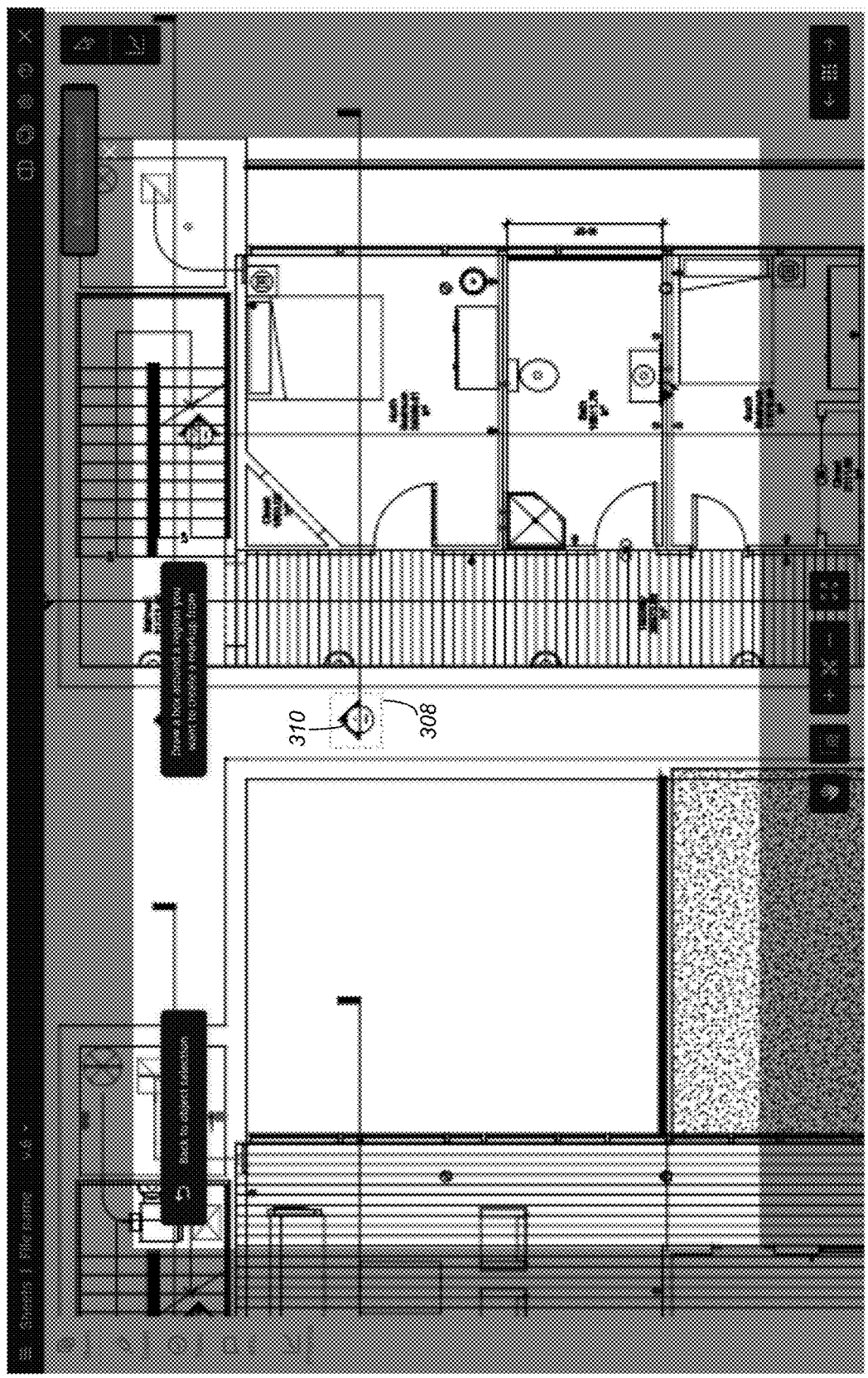
FIG. 3C illustrates a graphical user interface used to identify the graphical region that the user desires to create a markup from in accordance with one or more embodiments of the invention.

After selecting the object type (e.g., via the dialog window 304 of FIG. 3B), the interactive selection screen of FIG. 3C may be used to identify the graphical region that the user desires to create a markup from. Specifically, the user can draw a bounding box (e.g., that may be displayed with a different line/color pattern/shading/etc.) around the symbol to run the model on. In FIG. 3C, the user has drawn bounding box 308 around a specific symbol instance 310.

Figure 3D:
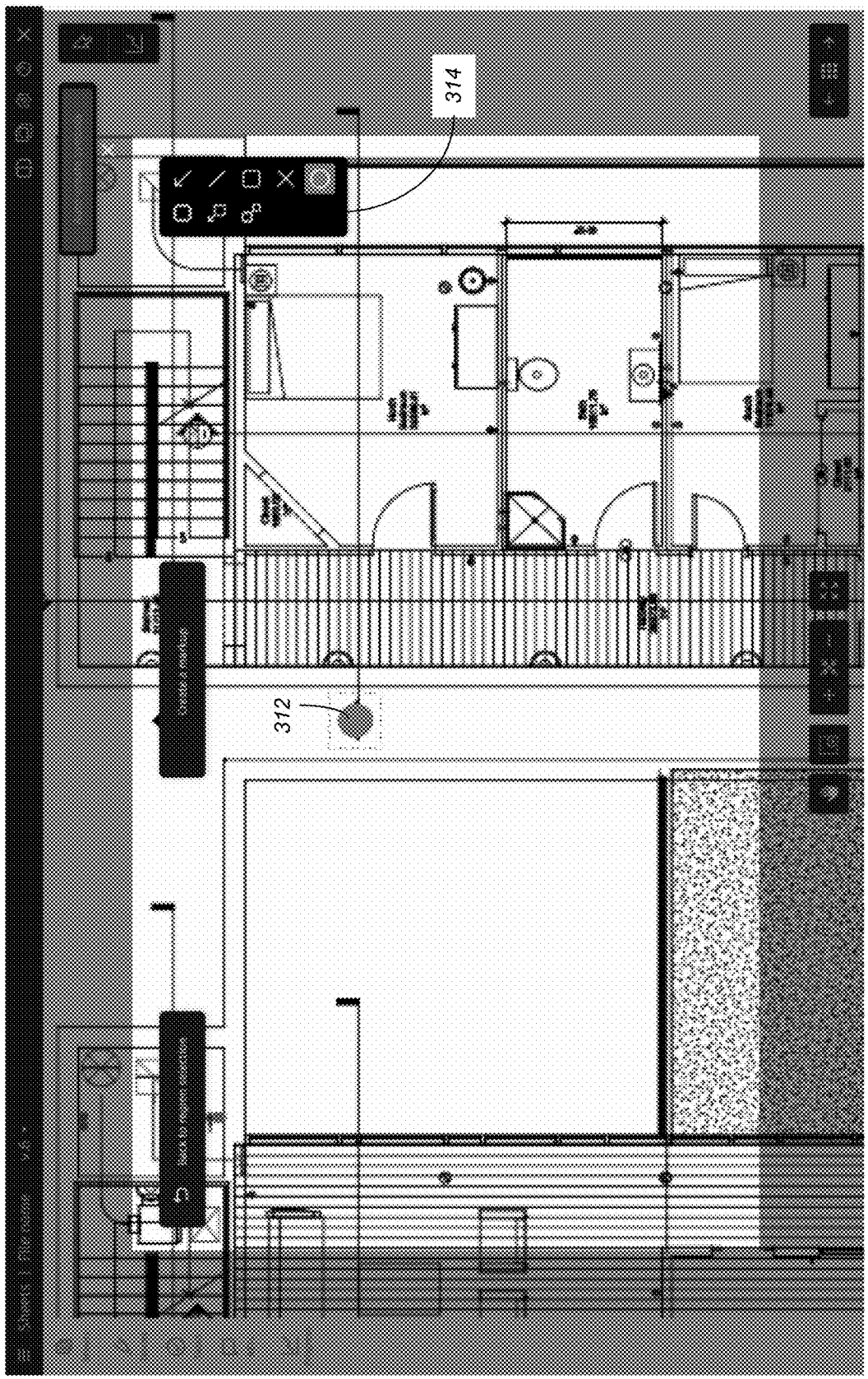
FIG. 3D illustrates the creation of a markup in a circle shape in accordance with one or more embodiments of the invention.

Once the bounding box 308 has been drawn, the user creates a markup in the desired shape and size that will be created for every symbol detected. FIG. 3D illustrates the creation of a markup 312 in a circle shape. The different shapes available to use as the markup 312 may be selected from a selection area 314 (e.g., a circle, X, square, line, line with arrow, etc.).

Figure 3E:
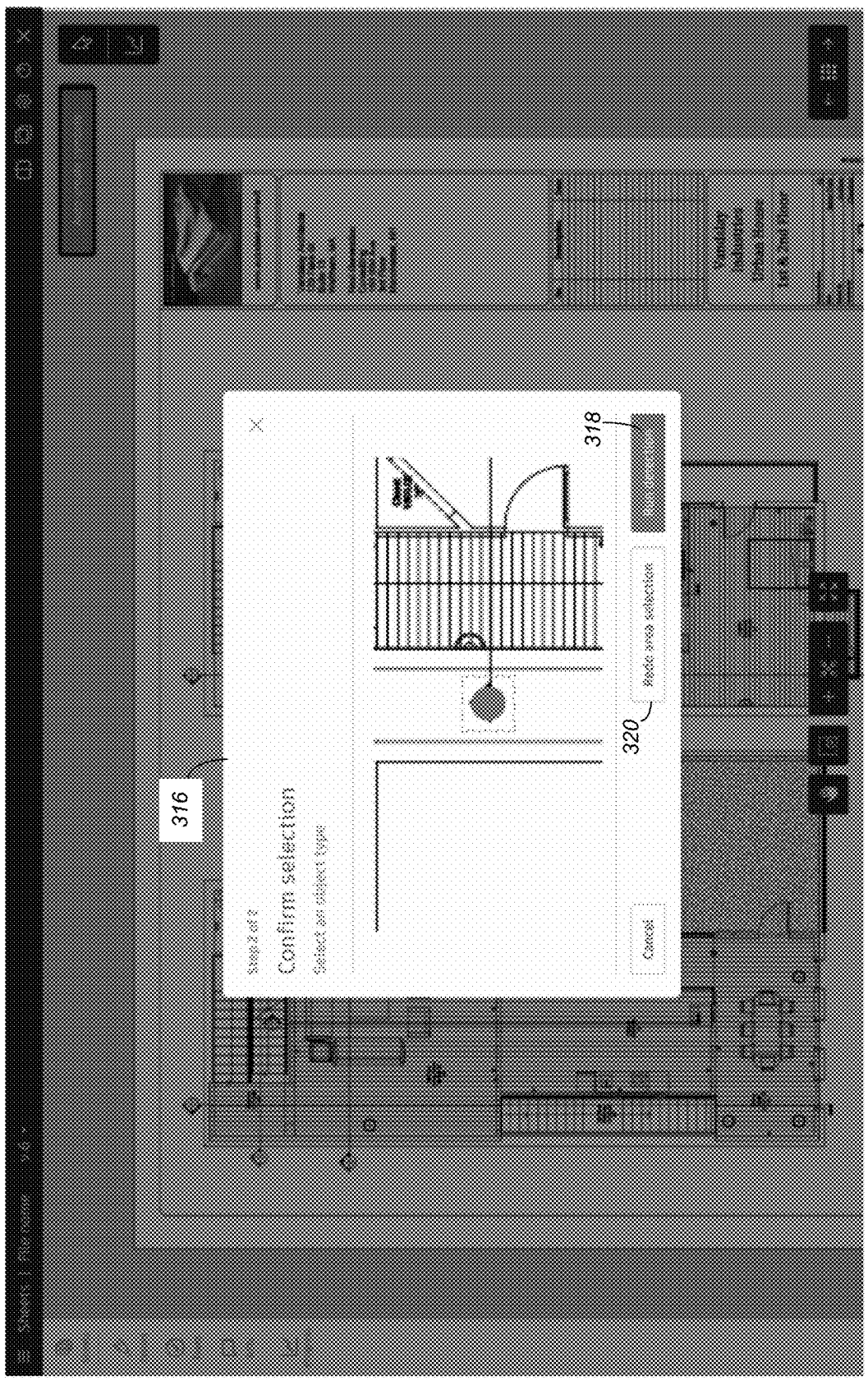
FIG. 3E illustrates an exemplary dialog window used to confirm object type and markup shape selections and begin the symbol detection processing in accordance with one or more embodiments of the invention.

After creating the markup 312, the user may be prompted to confirm the selection in order to run symbol detection. FIG. 3E illustrates an exemplary dialog window 316 used to confirm the selections (i.e., of the object type and markup shape) and begin the symbol detection processing (e.g., via selection of the "Run detection" button 318). Alternatively, the user may select button "Redo area selection" 320 to redo the bounding box/markup.

Once the user has elected to proceed, the system processes the drawing sheet 302 to identify any other symbols in the drawing sheet 302 that are similar to the symbol within the bounding box 308. In addition, the system generates progress tracking markups on such identified symbols. The process of searching the drawing sheet and identifying the symbols based on the image within the bounding box 308 may be performed utilizing a variety of image recognition techniques including template matching, computer vision techniques, machine learning models, vector data querying (e.g., based on a search/comparison for similar combinations of vectors), etc. Further, embodiments of the invention may also take into account the orientation and scaling of symbols and/or the type of drawing sheet/symbol being analyzed. For example, a mechanical drawing/symbol or electrical drawing/symbol may utilize different search techniques compared to each other and/or other drawing/symbol types. In addition, embodiments of the invention are not limited to identifying and searching for symbols but may also identify and search for different patterns, rooms, and/or locations (e.g., identifying the borders of a room, type of room, etc.). Further, patterns of images in a drawing sheet may represent different types of materials (e.g., different types of fire-rated walls, different patterns for hardwood floor v. carpeting, etc.). Accordingly, embodiments of the invention may differentiate/distinguish between different types of elements/objects within a drawing sheet.

Figure 3F:
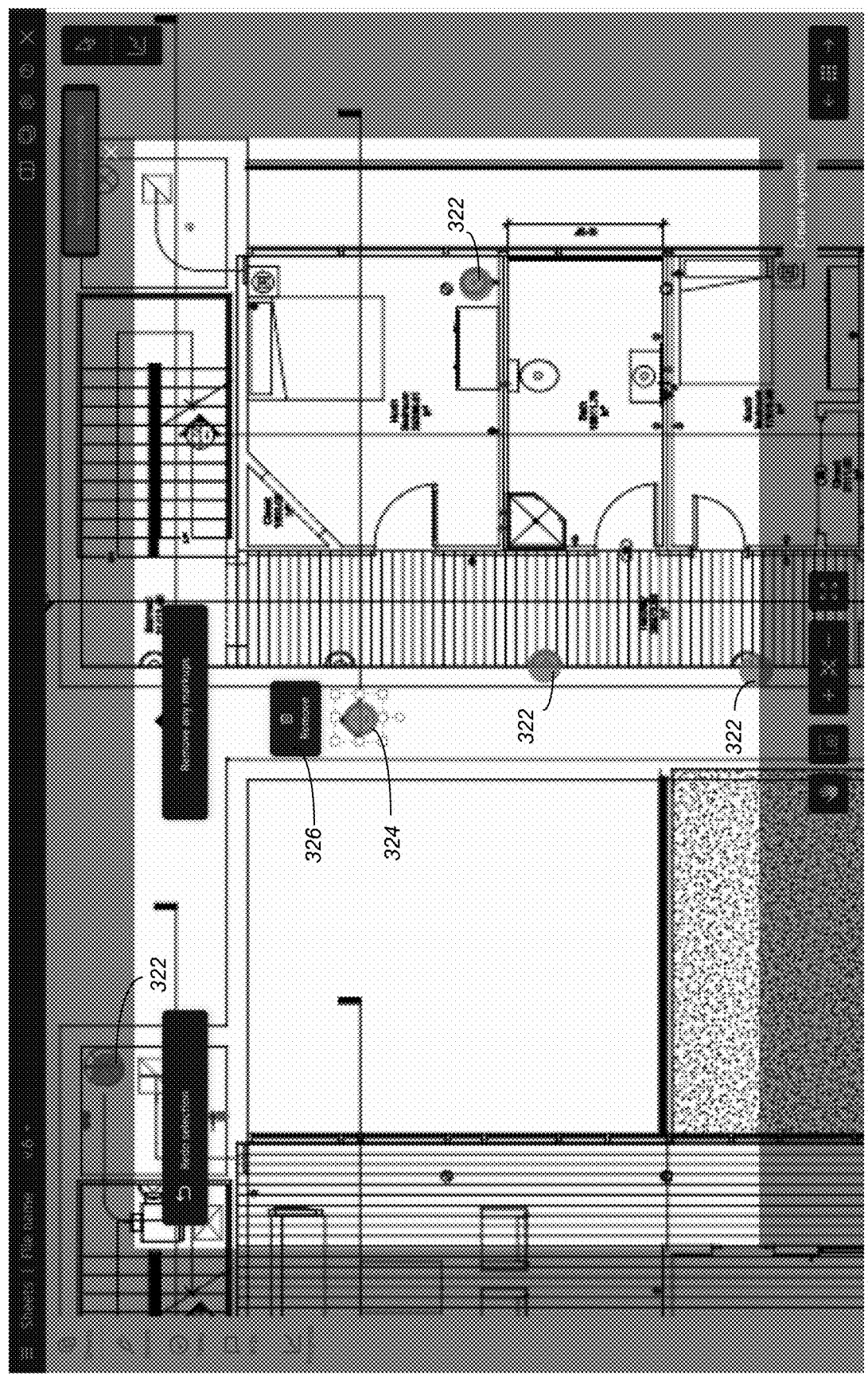
FIG. 3F illustrates a drawing sheet with numerous progress tracking markups that have been generated/created in accordance with one or more embodiments of the invention.

A graphical user interface may then be presented to the user with the created markups. FIG. 3F illustrates a drawing sheet 302 with numerous progress tracking markups 322 that have been generated/created (i.e., based on other symbols in the drawing sheet that match symbol 310). In addition, at this stage, the user has the option of selecting a particular markup (e.g., markup 324) to be removed (e.g., by selecting the markup 324 and clicking the "Remove" button 326). For example, if a particular markup 324 was created in error or out of order, it can be removed. As described above, in one or more embodiments, the symbol identification and markup creation process may be based on a heuristic or machine learning model. In this regard, when a markup 324 is removed, the model utilized to recognize/search the drawing sheet 302 may be updated such that the model more accurately detects/identifies/recognizes the symbols over time. More specifically, the symbol detection process detects the symbols based on such an ML model in an iterative manner through multiple detection cycles thereby improving the model over time.

Figure 3G:
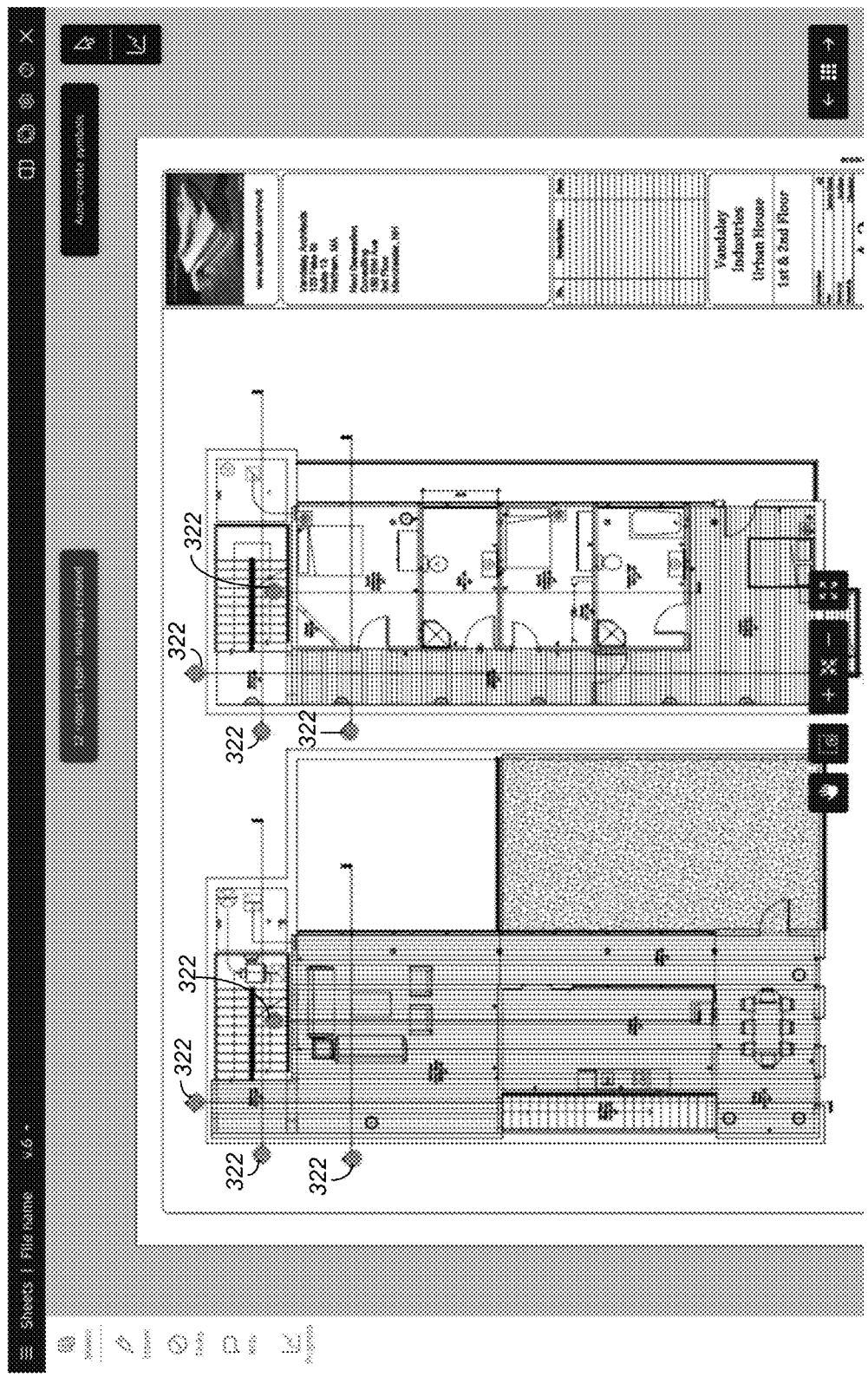
FIG. 3G illustrates a drawing sheet with finalized progress tracking markups displayed in accordance with one or more embodiments of the invention.

Once the user has finalized the markups that have been created, the system may display the drawing sheet with the progress tracking markups in place. FIG. 3G illustrates a drawing sheet with all the finalized progress tracking markups 322 displayed (e.g., in a distinguishable color/pattern as set forth in the properties/configuration described above) in accordance with one or more embodiments of the invention. This process can be repeated for every drawing sheet (e.g., one drawing sheet for every floor of a building). For example, if a building has fifty (50) floors and one hundred (100) markups are to be defined for each floor, what used to take several hours to manually identify every markup can now be performed near instantaneously in an automated/autonomous manner for all fifty (50) floors.

Once finalized, activity sequences for individual progress tracking markups 322 (or subset/set of such markups 322) may be added/tracked. In this regard, a set of one or more progress tracking markups 322 may be selected (or all of the markups 322 may be selected as a group) and the selected markups 322 can be updated as a set by updating the activity for such selected markups 322. For example, two or three markups 322 (or all of the markups 322) for a "basic wall" symbol may be selected and the activity may be set for all selected markups 322 to "insulation".

Use Case Overview

As described above, the core workflow is that of progress tracking. In a progress tracking (also referred to as "symbol detection") workflow, a user identifies the progress object type to create, based on previous progress tracking configuration(s). Once the symbol on the sheet to find has been identified, the individual progress tracking object instances (markups) will be autonomously created on the sheet. Users can then track progress created against the created progress tracking markups, which will provide progress data in dashboards (see description below) and in exported data. To provide such a workflow, a user may upload a PDF (portable document format) document into an application that coverts the PDFs to drawing "sheets". In the application, a user can then navigate to a given sheet and enter into a "symbol detection" or "progress tracking" workflow as described in FIGS. 1, 2A-2C, and 3A-3G. The user identifies symbols on the sheet (e.g., as depicted in FIG. 3C) and identifies what kind of object/location that the identified symbols represent (e.g., walls, pillars, junction boxes, bathroom, etc.) (e.g., by creating a markup as depicted in FIG. 3D). The user confirms the selection (e.g., as depicted in FIG. 3E), and runs the detection tool. The tool of embodiments of the invention (e.g., via an ML model) recognizes the symbols being detected and identifies additional such symbols that exist on the "sheet". The tool then marks those symbols across the entire sheet as the kind of object/location previously defined. The user can delete/add marked objects (e.g., as depicted in FIG. 3F), which deletions/additions can be fed back into the system to improve the ML model.

An alternative workflow may be referred to as a quantity takeoff workflow. In such a quantity takeoff workflow, during the symbol detection workflow, the user identifies the "takeoff type" objects to create (based on the list of takeoff types in the takeoff package). Once the symbol on the sheet to find has been identified, the individual takeoff object instances (markups) will be created on the sheet. Users can leverage this takeoff data to power their cost estimates of materials and labor hours.

An additional workflow may be referred to as a location detection workflow. Building on and during the symbol detection workflow, the user identifies that they are attempting to automatically/autonomously define room and location boundaries. The system automatically/autonomously finds room bounds and uses the text, numbers, and other symbols within different "rooms" to identify the specific room and location that is within each bounded location (i.e., based on the "location breakdown structure," which includes a comprehensive hierarchical breakdown of all of the locations in the project). Once the location boundaries are identified and confirmed, these bounded locations can enable automatically/autonomously providing "location" data to other products that leverage the sheet viewer. For example, issues, requests for information (RFIs), progress markups, etc. that are created on the drawing sheets can automatically "inherit" locations as defined in this process.

Dashboards

Once the trackable objects have been defined on a drawing sheet, it may be desirable to track the progress of the objects/elements over time. Referring to FIG. 1, dashboard 118 provides a place for users to view their current progress as well as progress over time via one or more visualizations (e.g., that may be "easy-to-scan").

Figure 4A:
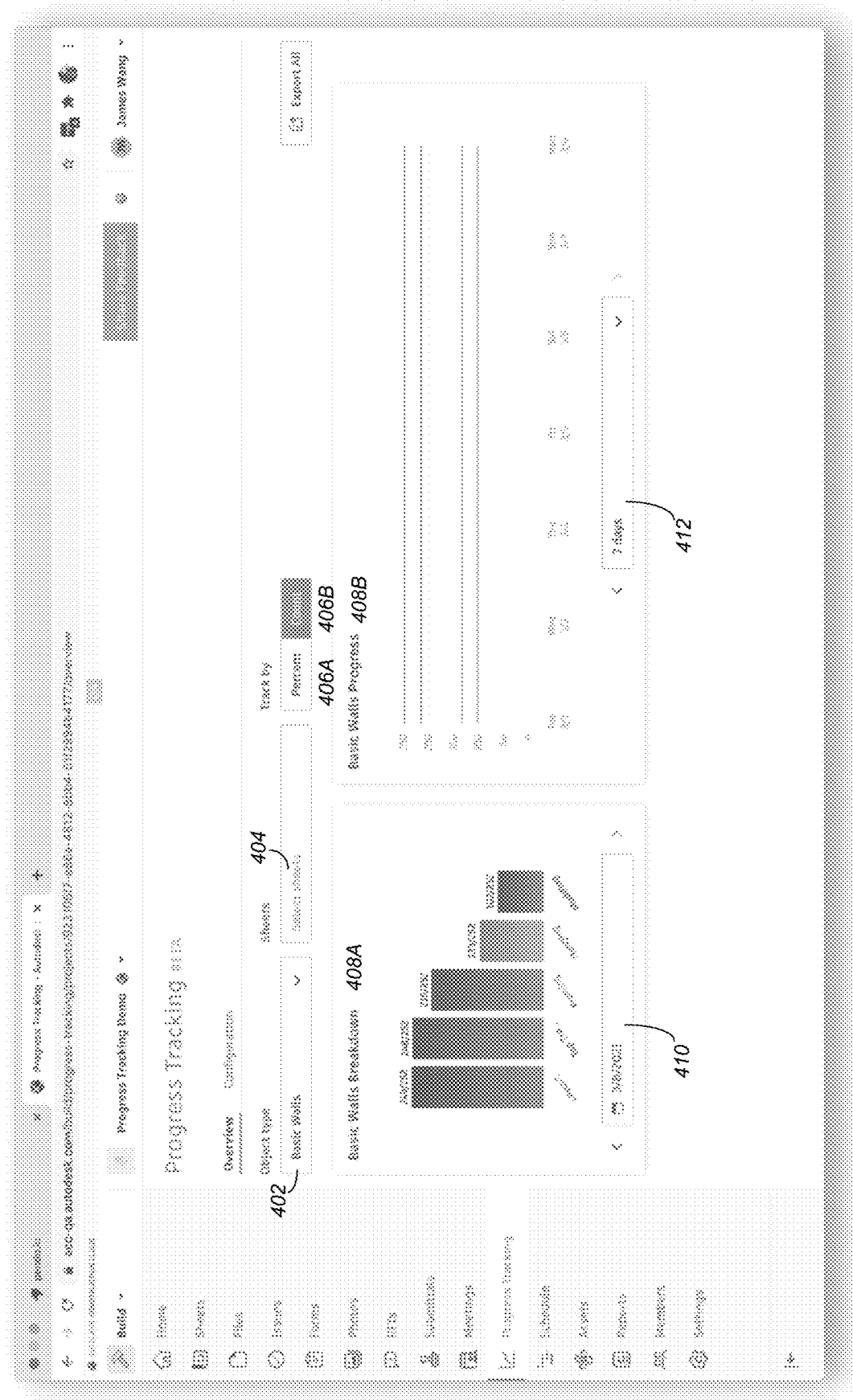
FIG. 4A illustrates a dashboard visualization for a snapshot in time in accordance with one or more embodiments of the invention.

FIG. 4A illustrates a dashboard visualization in accordance with one or more embodiments of the invention. Users can select the "object type," in area 402 (which may have the same object types defined in the configuration as described above (i.e., in with respect to FIG. 2B)). The user can also select the sheets in area 404 that the user desires to track progress in, as well as whether to track by percent 406A or count 406B. In this regard, data is represented as a percent 406A or count 406B of the markups for the given object type 402. Alternative embodiments may also provide the ability to calculate progress by measurement data, which may be based on users "calibrating" their sheets, which can be used to derive measurement data from the markups. For example, walls using linear markups may provide "linear feet" in progress calculations.

Once the parameters have been selected/defined in areas 402-406, the results of the progress tracking may be dynamically displayed in real time in charts 408A and 408B. If no specific sheets are selected (e.g., in area 404), the charts 408A and 408B represent the aggregation of all individual progress tracking object instances (markups) across the entire project (see "252" as the denominator for each column in the basic walls breakdown bar chart 408A). Each item in the charts 408 is from the "activities" defined in configuration. Each progress tracking object instance has a list of activities to mark complete. The charts 408 reflect the total sum of activities marked complete for each object type. The left-hand chart 408A displays a snapshot of completion for a moment in time (e.g., today of a specific date in the past) (as indicated by the date in area 41) while the right hand chart 408B displays progress over time (e.g., completion over the past 7 days)(as indicated in area 412). In FIG. 4A, as selected in area 410, chart 408A illustrates the snapshot for Mar. 8, 2021, in which 249 of 252 basic walls have completed the layout activity, 248 of 252 basic walls have completed the top track activity, 215 of 252 basic walls have completed the framing activity, 133 of 252 basic walls have completed the hanging activity, and 102 of 252 basic walls have completed the mudding activity for basic walls. Chart 408B illustrates the basic walls progress as selected in area 412 for the past 7 days.

Figure 4B:
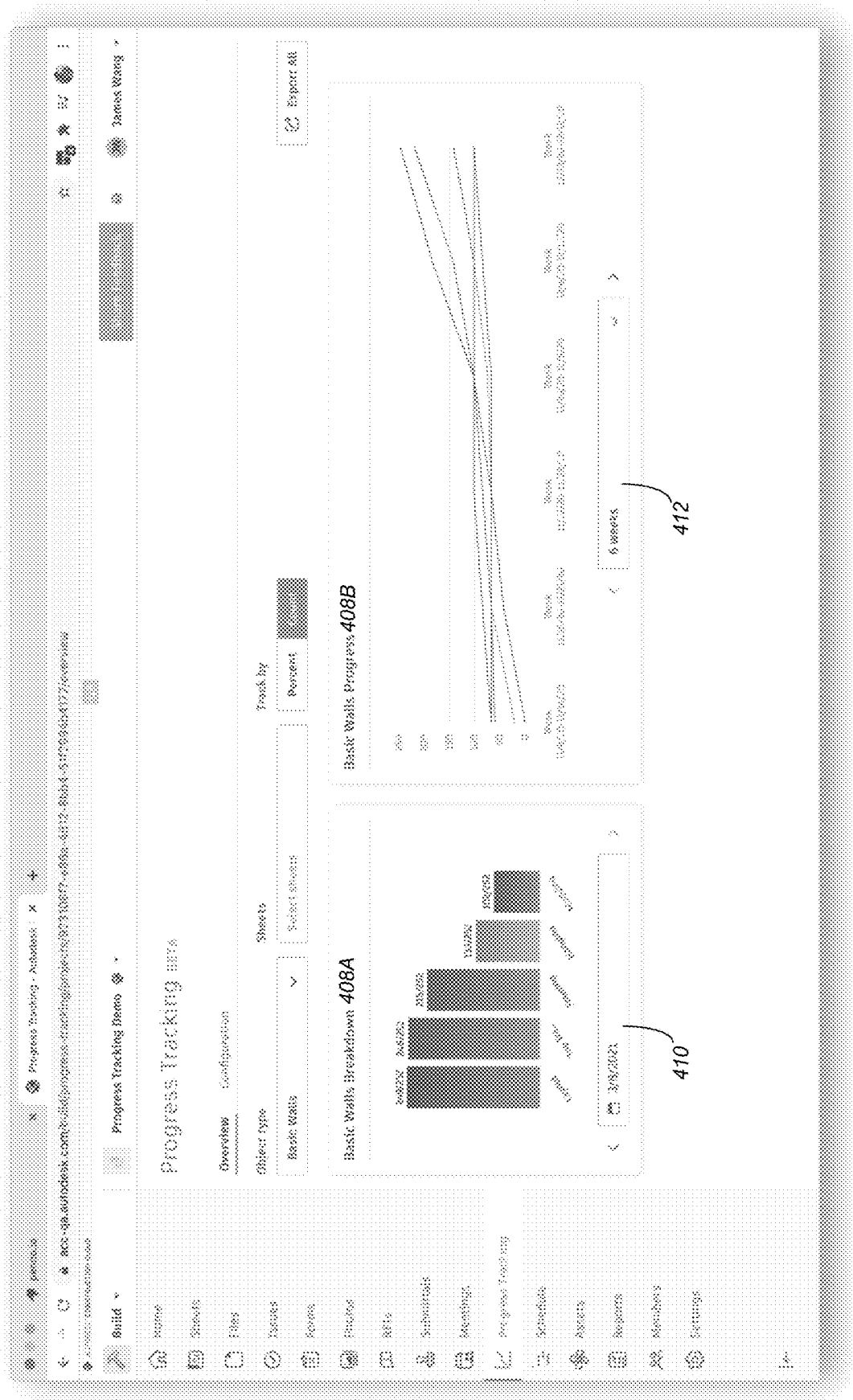
FIG. 4B illustrates a dashboard visualization for the past six (6) weeks in accordance with one or more embodiments of the invention.

FIG. 4B illustrates a dashboard visualization showing the same visualization as in FIG. 4A but utilizes the past 6 weeks selected in area 412 in basic walls progress chart 408B. In this regard, the user is enabled with the capability to select different date ranges.

Figure 4C:
FIG. 4C illustrates a dashboard visualization for a specific sheet in accordance with one or more embodiments of the invention.

FIG. 4C illustrates a dashboard visualization that has been filtered by selecting a specific sheet in area 404 (e.g., one (1) selected sheet). Such an individual sheet selection enables users to filter the view to a specific sheet in order to understand the current state of progress or the rate of progress for a given location. In alternative embodiments, users may also have the ability to filter by defined "locations," such as "2nd floor," or "Room 201."

Logical Flow

Figure 5:
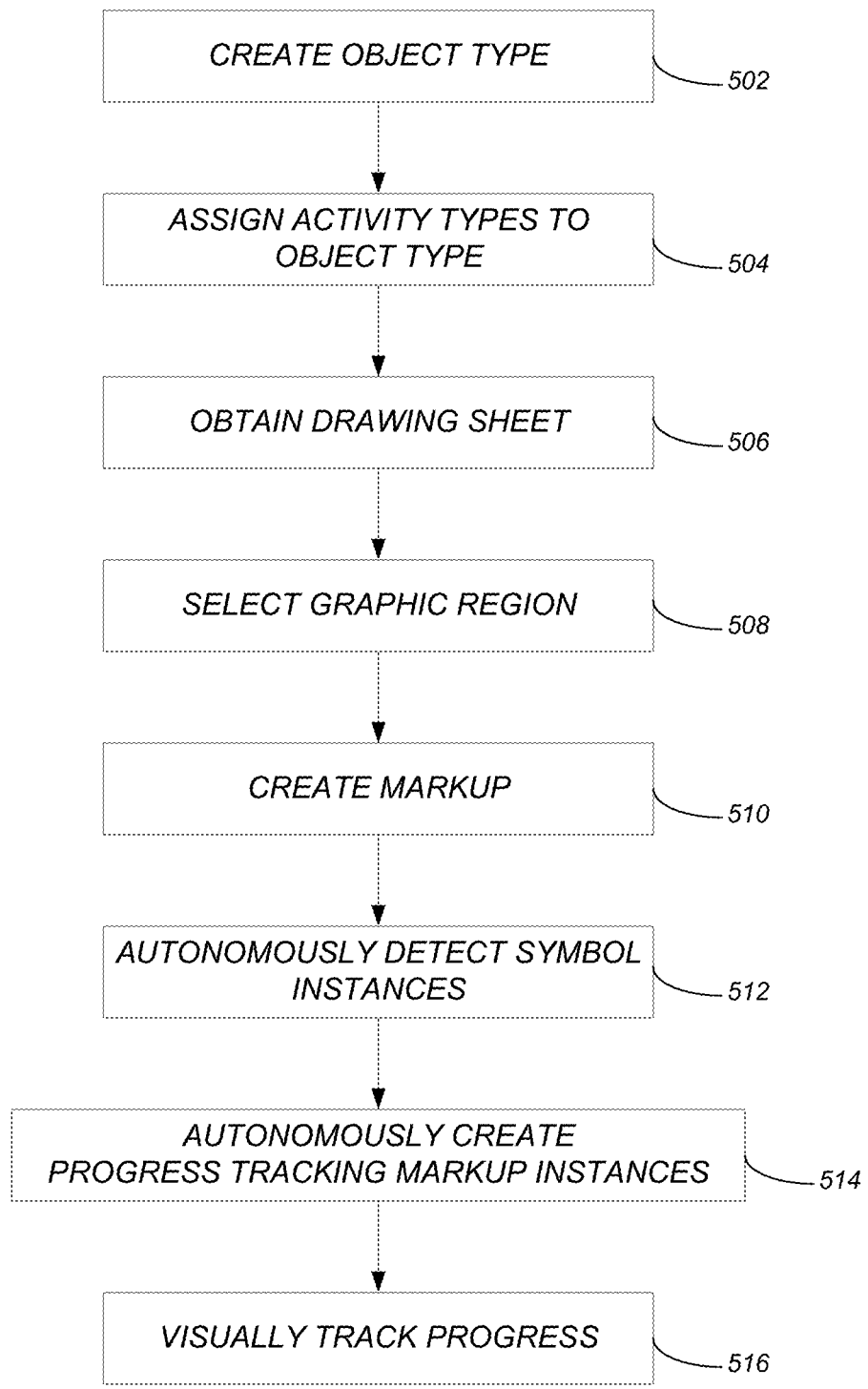
FIG. 5 illustrates the logical flow for tracking object progress in a current drawing sheet in accordance with one or more embodiments of the invention.

FIG. 5 illustrates the logical flow for tracking object progress in a current drawing sheet in accordance with one or more embodiments of the invention.

At step 502, an object type is created in a computer application.

At step 504, two or more activity types are assigned to the object type. The two or more activity types represent a progression of an object of the object type.

At step 506, the current drawing sheet is obtained. The current drawing sheet is a portable document format (PDF) document that includes multiple symbol instances of a symbol. The multiple symbol instances each represent an object instance of the object.

At step 508, a graphic region in the current drawing sheet is selected. The graphic region contains one of the multiple symbol instances. To select the graphic region, a user may draw a bounding box around the symbol.

At step 510, a markup is created on the current drawing sheet based on the selected graphic region. To create the markup, the user may specify a shape and size for the markup.

At step 512, the multiple symbol instances are autonomously (e.g., automatically, dynamically, in real time without additional user input) detected based on the selected graphic region. Such a detection may be performed utilizing an ML or heuristic model that is maintained. The ML model models symbols previously detected on other/previously processed drawing sheets. Further, the ML model is updated based on user input that corrects the progress tracking markup instances (described below in step 514). In this regard, the ML model is applied based on the selected graphic region to detect the multiple symbol instances in the current drawing sheet.

At step 514, progress tracking markup instances of the markup are autonomously (e.g., automatically, dynamically, in real time without additional user input) created for the multiple symbol instances. Each progress tracking markup instance is linked to the object type. Once autonomously created, user input may be accepted/received correcting (e.g., adding/removing) one or more of the progress tracking markup instances.

At step 516, the progress of the object instances is visually tracked using graphical user interface (GUI) visualizations. The GUI visualizations provide a visual representation of the progression via the progress tracking markup instances. The GUI visualizations may graphically differentiate the progress tracking markup instances based on a current activity type associated with each progress tracking markup instance. In one or more embodiments, the GUI visualizations may consist of a dashboard visualizing the progression over time. Alternatively (or in addition), the GUI visualizations may consist of a dashboard that visualizes a total sum of the activity types that have been completed for each object type. Further, the GUI visualizations may provide a unique color for each activity type.

Hardware Environment

Figure 6:
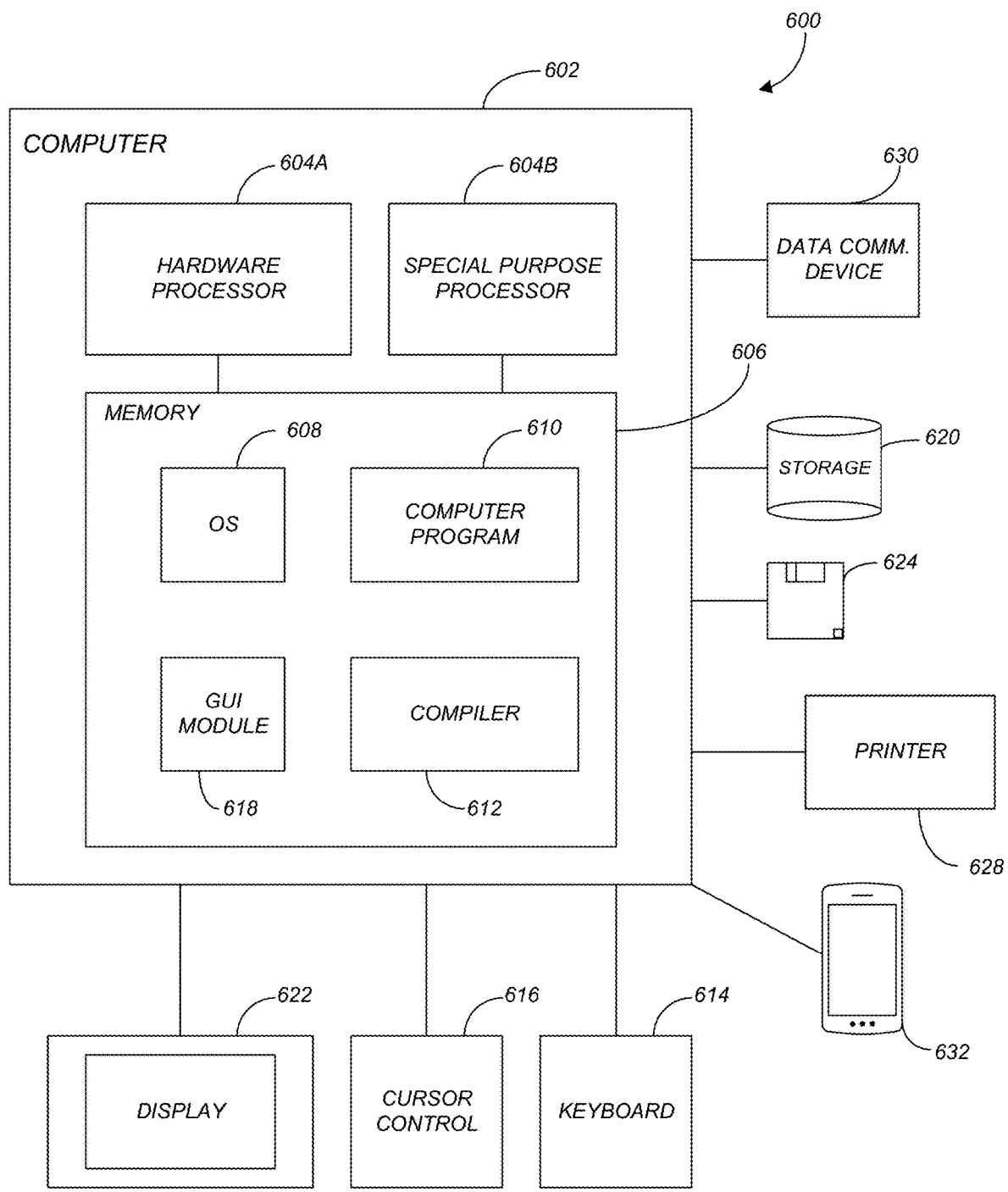
FIG. 6 is an exemplary hardware and software environment used to implement one or more embodiments of the invention.

FIG. 6 is an exemplary hardware and software environment 600 (referred to as a computer-implemented system and/or computer-implemented method) used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 (e.g., a computer-aided design [CAD] application, an building information model (BIM) application, etc.) under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

Figure 7:
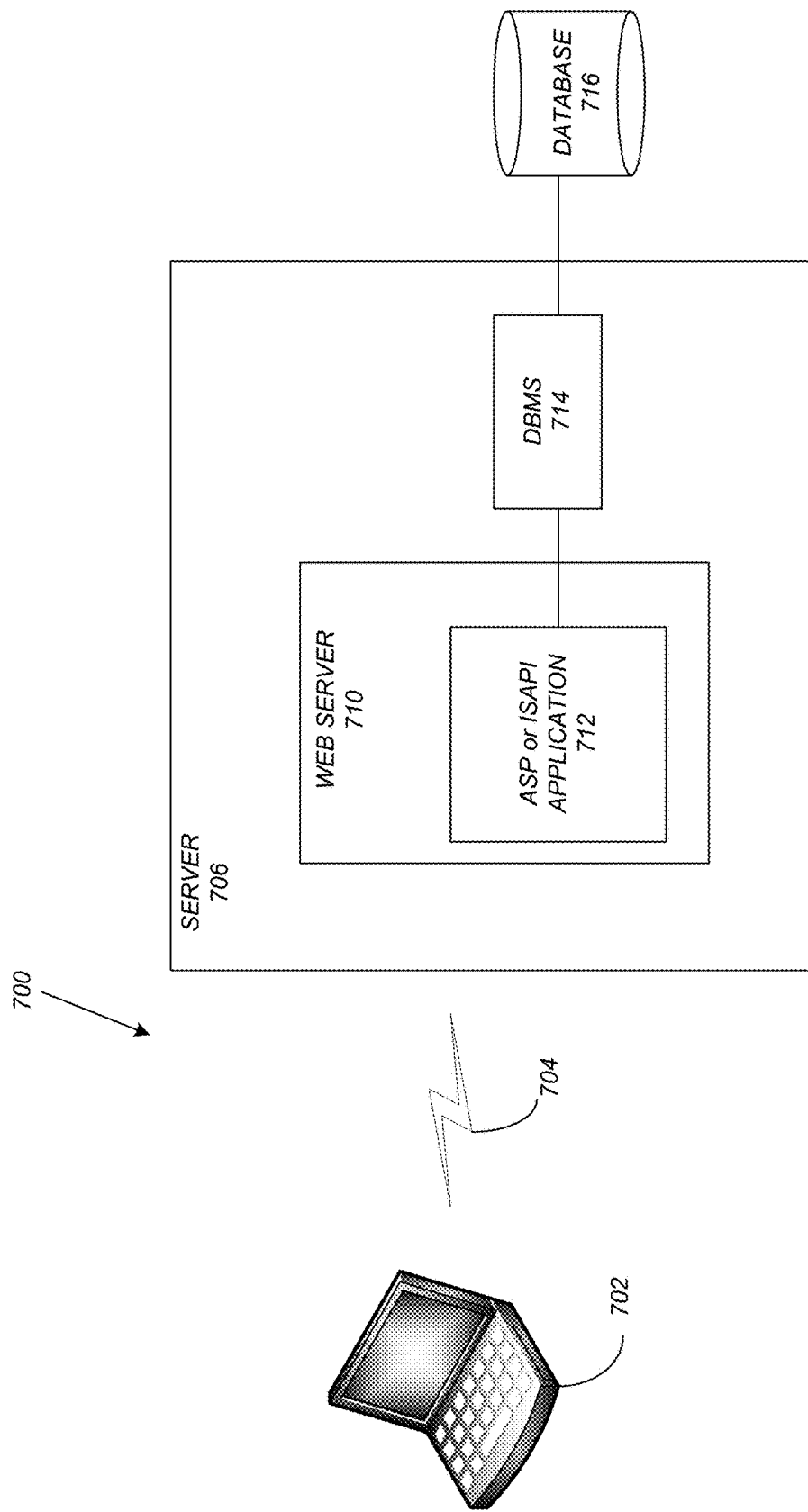
FIG. 7 schematically illustrates a typical distributed/cloud-based computer system using a network to connect client computers to server computers in accordance with one or more embodiments of the invention.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706. Embodiments of the invention are implemented as a software/CAD application on a client 702 or server computer 706. Further, as described above, the client 702 or server computer 706 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for tracking object progress in a current drawing sheet, comprising:
   (a) creating, in a computer application, an object type;
   (b) assigning, in the computer application, two or more activity types to the object type, wherein the two or more activity types represent a progression of an object of the object type;
   (c) obtaining, in the computer application, the current drawing sheet, wherein:
      (i) the current drawing sheet comprises a portable document format (PDF) document without computer aided design (CAD) or building information model (BIM) context;
      (ii) the current drawing sheet comprises multiple symbol instances of a symbol, wherein the multiple symbol instances comprise graphic symbols on the current drawing sheet;

(iii) the multiple symbol instances each represent an object instance of the object;
(d) selecting a graphic region in the current drawing sheet, wherein the graphic region contains one of the multiple symbol instances;
(e) creating a markup on the current drawing sheet based on the selected graphic region;
(f) autonomously detecting the multiple symbol instances based on the selected graphic region;
(g) autonomously creating progress tracking markup instances of the markup for the multiple symbol instances detected, wherein each progress tracking markup instance is linked to the object type; and
(h) visually tracking the progress of the object instances using graphical user interface (GUI) visualizations, wherein the GUI visualizations provide a visual representation of the progression via the progress tracking markup instances.

2. The computer-implemented method of claim 1, wherein the selecting the graphic region comprises drawing a bounding box around the symbol.

3. The computer-implemented method of claim 1, wherein the creating the markup comprises specifying a shape and size for the markup.

4. The computer-implemented method of claim 1, further comprising:
accepting user input correcting the progress tracking markup instances.

5. The computer-implemented method of claim 4, wherein the autonomously detecting comprises:
maintaining a machine learning (ML) model, wherein:
the ML model models symbols previously detected on other drawing sheets; and
the ML model is updated based on the user input correcting the progress tracking markup instances; and
applying the ML model based on the selected graphic region to detect the multiple symbol instances in the current drawing sheet.

6. The computer-implemented method of claim 4, wherein the correcting removes one or more of the progress tracking markup instances.

7. The computer-implemented method of claim 1, wherein the GUI visualizations graphically differentiate the progress tracking markup instances based on a current activity type associated with each progress tracking markup instance.

8. The computer-implemented method of claim 1, wherein the GUI visualizations comprises a dashboard visualizing the progression over time.

9. The computer-implemented method of claim 1, wherein the GUI visualizations comprises a dashboard visualizing a total sum of the activity types that have been completed for each object type.

10. The computer-implemented method of claim 1, wherein the GUI visualizations provide a unique color for each activity type.

11. A computer-implemented system for tracking object progress in a current drawing sheet, comprising:
(a) a computer having a memory;
(b) a processor executing on the computer;
(c) the memory storing a set of instructions, wherein the set of instructions, when executed by the processor cause the processor to perform operations comprising:
(i) creating, in a computer application, an object type;
(ii) assigning, in the computer application, two or more activity types to the object type, wherein the two or more activity types represent a progression of the object of the object type;
(iii) obtaining, in the computer application, the current drawing sheet, wherein:
(1) the current drawing sheet comprises a portable document format (PDF) document without computer aided design (CAD) or building information model (BIM) context;
(2) the current drawing sheet comprises multiple symbol instances of a symbol, wherein the multiple symbol instances comprise graphic symbols on the current drawing sheet;
(3) the multiple symbol instances each represent an object instance of the object;
(iv) selecting a graphic region in the current drawing sheet, wherein the graphic region contains one of the multiple symbol instances;
(v) creating a markup on the current drawing sheet based on the selected graphic region;
(vi) autonomously detecting the multiple symbol instances based on the selected graphic region;
(vii) autonomously creating progress tracking markup instances of the markup for the multiple symbol instances detected, wherein each progress tracking markup instance is linked to the object type; and
(viii) visually tracking the progress of the object instances using graphical user interface (GUI) visualizations, wherein the GUI visualizations provide a visual representation of the progression via the progress tracking markup instances.

12. The computer-implemented system of claim 11, wherein the selecting the graphic region comprises drawing a bounding box around the symbol.

13. The computer-implemented system of claim 11, wherein the creating the markup comprises specifying a shape and size for the markup.

14. The computer-implemented system of claim 11, further comprising:
accepting user input correcting the progress tracking markup instances.

15. The computer-implemented system of claim 14, wherein the autonomously detecting comprises:
maintaining a machine learning (ML) model, wherein:
the ML model models symbols previously detected on other drawing sheets; and
the ML model is updated based on the user input correcting the progress tracking markup instances; and
applying the ML model based on the selected graphic region to detect the multiple symbol instances in the current drawing sheet.

16. The computer-implemented system of claim 14, wherein the correcting removes one or more of the progress tracking markup instances.

17. The computer-implemented system of claim 11, wherein the GUI visualizations graphically differentiate the progress tracking markup instances based on a current activity type associated with each progress tracking markup instance.

18. The computer-implemented system of claim 11, wherein the GUI visualizations comprises a dashboard visualizing the progression over time.

19. The computer-implemented system of claim 11, wherein the GUI visualizations comprises a dashboard visualizing a total sum of the activity types that have been completed for each object type.

20. The computer-implemented system of claim 11, wherein the GUI visualizations provide a unique color for each activity type.

* * * * *